United States Patent
McGahey et al.

[15] 3,702,439
[45] Nov. 7, 1972

[54] LOW IMPEDANCE FIXED POINT TEST PROBE

[72] Inventors: Bruce Hamilton McGahey, South Plainfield; John Wesley West, Millington, both of N.J.

[73] Assignee: Bell Telephone Laboratories, Incorporated, Murray Hill, N.J.

[22] Filed: Aug. 12, 1970

[21] Appl. No.: 63,232

[52] U.S. Cl. ............................324/158 P, 324/72.5
[51] Int. Cl. ....................G01r 31/22, G01r 31/02
[58] Field of Search..324/158 P, 158 F, 158 R, 73 R, 324/72.5, 149

[56] References Cited

UNITED STATES PATENTS

| | | | |
|---|---|---|---|
| 3,445,770 | 5/1969 | Harmon | 324/158 P |
| 3,437,929 | 4/1969 | Glenn | 324/158 P |
| 3,382,437 | 5/1968 | Illingworth | 324/158 |
| 3,405,361 | 10/1968 | Kattner et al | 324/158 P |
| 3,377,514 | 4/1968 | Ruehlemann et al. | 317/101 CP |

*Primary Examiner*—Rudolph V. Rolinec
*Assistant Examiner*—Ernest F. Karlsen
*Attorney*—R. J. Guenther and Arthur J. Torsiglieri

[57] ABSTRACT

A test probe includes a picture frame insulator support member on which relatively short cantilever beam-like members are mounted. One end of each of the cantilever beam-like members is used as a probe to contact a beam lead or bonding pad of an integrated circuit chip which is part of a semiconductor wafer. The probe's geometry, the material used for its construction, and the close proximity of the insulator support member to the integrated circuits to be tested all contribute to the low impedance of the probe and the sliding contact-type action which occurs during the probing operation.

4 Claims, 4 Drawing Figures

INVENTORS
B. H. McGAHEY
J. W. WEST
BY
ATTORNEY

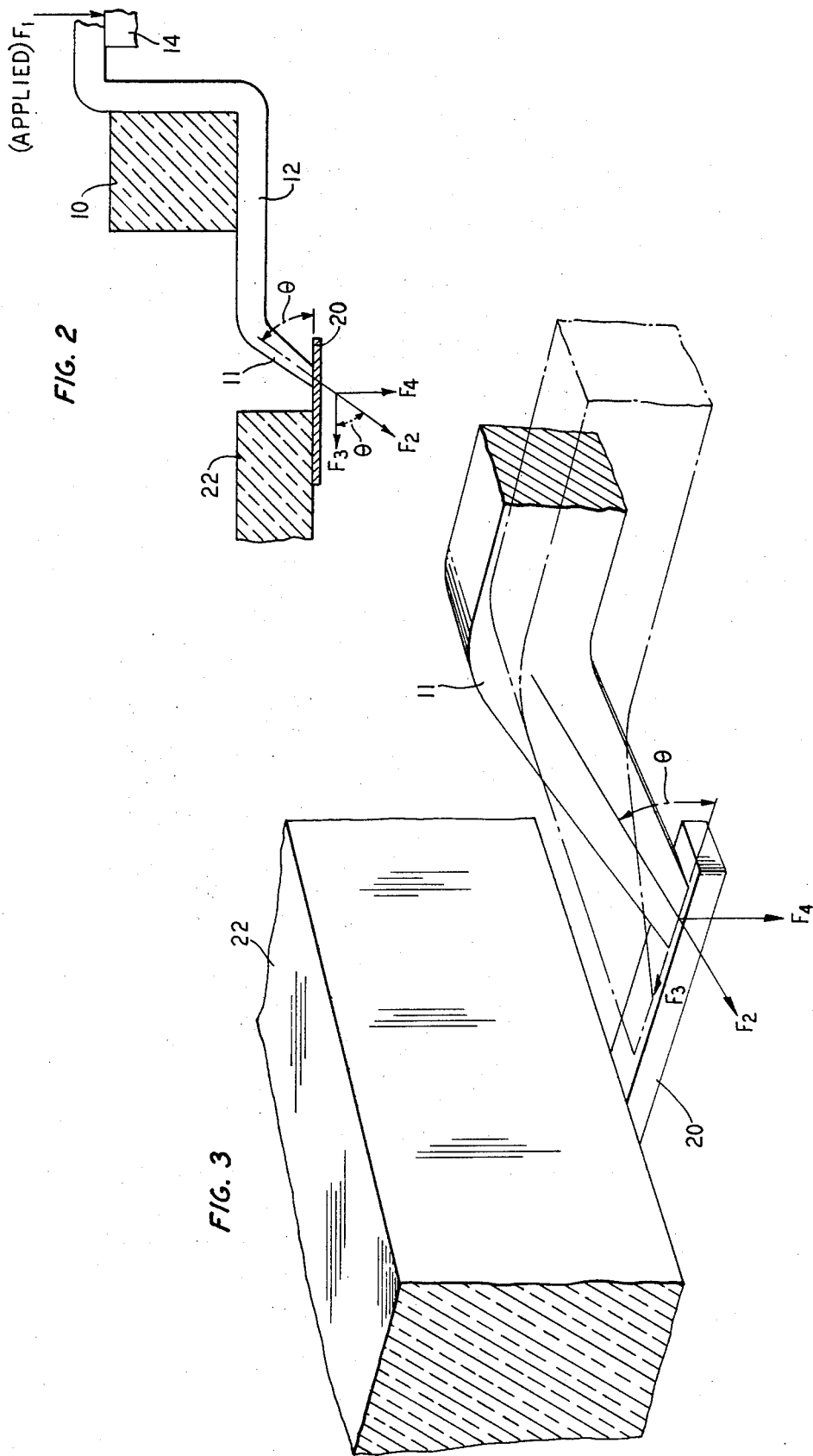

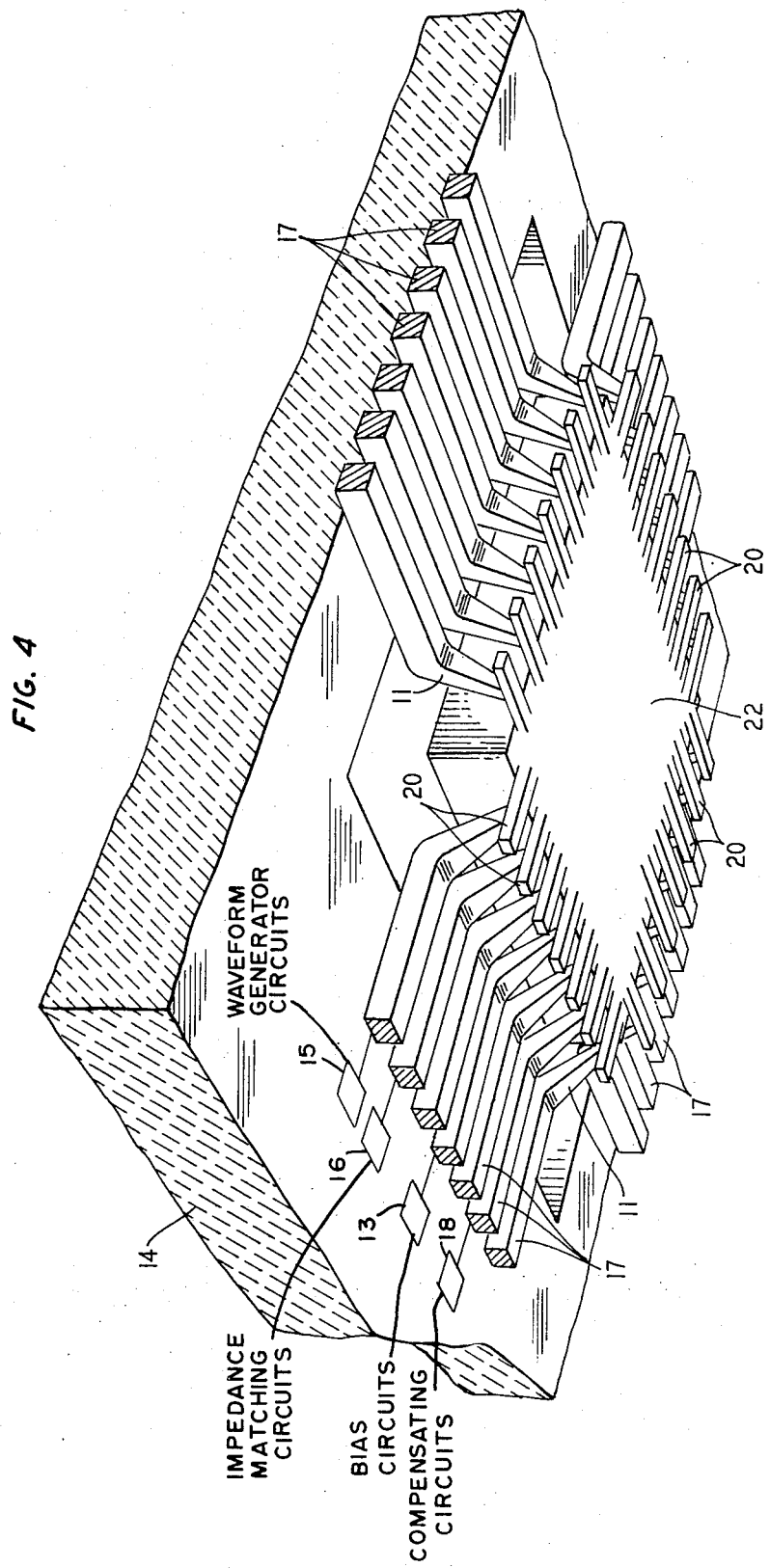

LOW IMPEDANCE FIXED POINT TEST PROBE

BACKGROUND OF THE INVENTION

This invention relates to a test probe and, more particularly, to a fixed point low impedance test probe device for providing low impedance electrical connections with an element having a plurality of terminals, such as an integrated circuit.

The cost of handling and packaging individual integrated circuit chips is a relatively large part of the total production cost. Quality control procedures can reduce such costs by an early elimination of individual chips that do not meet required electrical standards. This can be accomplished by electrically testing all the individual chips while they are still in the semiconductor wafer form.

Electrical tests on integrated circuit chips in the semiconductor wafer form require dependable contacts with the terminals of these chips. Such terminals are essentially of two basic types. The first is a beam-like lead which makes electrical contact with the circuit and extends from the substrate on which the individual circuit is fabricated. The second type is a metalized peripheral area which is in electrical contact with the chip circuit and is contained within the boundaries of the individual chip substrate area.

A combination that allows electrical contact to be made to the terminals of an integrated circuit comprises a plurality of long needle-like wires etched down to a fine point at one end and mounted by the other end to a fixture that allows the pointed end to be positioned to any desired orientation. A plurality of these adjustable probes may be used to apply the proper bias voltages, power supplies, and ground potentials necessary to check the static (DC) parameters of an integrated circuit still in the semiconductor wafer form. Waveform generators may be coupled to this assembly to allow dynamic (AC) testing. In addition, a programmed computer may be used to automate the testing process.

The response time of today's integrated circuits has increased into the subnanosecond region. This advance has made it difficult to obtain accurate static (DC) test data from integrated circuits because of the tendency of these circuits while under test to ring and oscillate during DC transients due to the relatively large reactances of the needle-like probes utilized in the probing operation. Solutions to this problem, such as the use of capacitors to act as dampers, heavy multiple ground straps to prevent ground loop oscillations, and the rewriting of computer test programs to allow more time between tests in order to allow oscillations and ringing to damp out, have all been only partially successful.

It had been true that a close correlation did exist between static (DC) test results performed while the individual circuit chips were still in the semiconductor wafer form and dynamic (AC) tests performed after the individual circuit chips had been separated from the semiconductor wafer and packaged. This correlation had allowed the manufacturers and users of integrated circuits to predict fairly accurately from the static test results the dynamic performance of an integrated circuit before it had been separated from the semiconductor wafer and packaged. With the advent of subnanosecond responding integrated circuits, this correlation has been seriously diminished to a point at which it has become desirable to dynamically, as well as statically, test these circuits while they are still in the semiconductor wafer form.

Commercially available integrated circuit semiconductor wafer test probes do not have the capability of dynamically testing subnanosecond responding integrated circuits and giving accurate results due to the relatively high reactances of the test probes themselves, which cause these circuits to ring and go into sustained oscillations. This reactance problem is caused by the use of relatively long and thick, individual needle-like wires as probes. A serious need exists for a test probe that can be used to perform accurate static (DC) and dynamic (AC) tests on subnanosecond responding integrated circuits still in the semiconductor wafer form.

Another serious problem encountered in the use of these commercially available probes is the damage they cause to the areas they contact on the integrated circuits. These probes tend to dig into the surface of the area being probed and thereby to ruin some otherwise good circuit chips. This problem exists due to the geometry and physical structure of the wire probes utilized and their relative positions with respect to the areas being probed.

Still another problem is caused by impurities on the surfaces of the probe areas of the integrated circuits which tend to cause a high contact impedance between the probes and the probed surfaces. This high contact impedance severely limits the accuracy of most electrical tests.

OBJECTS OF THE INVENTION

It is a primary object of this invention to provide a test probe having the capacity of performing accurate static (DC) and dynamic (AC) tests on subnanosecond responding integrated circuits still in the semiconductor wafer form.

A second primary object of this invention is to provide a test probe fixture which does minimal damage to the circuit under test, is self-cleaning, and results in low contact impedance.

Another object is to provide a test probe which can be used to check the continuity of printed wiring.

SUMMARY OF THE INVENTION

These and other objects of the invention are attained in an illustrative embodiment thereof comprising a test probe consisting of a plurality of cantilever beam-like probes attached to a first insulator support member and coupled to a second insulator support member. The probes are attached to the first insulator support member, which is in the shape of a picture frame, and formed into the desired geometry. All probes attached to any one side of the picture frame insulator support member are parallel to each other. The first insulator support member is inserted into a second insulator support member containing an opening slightly larger than the first insulator support member. One end of each of the probes is then coupled to the top surface of the second insulator support member at the same point at which any necessary impedance matching, compensating, DC bias, and waveform generator circuits have been attached.

Another illustrative embodiment of the invention, which also achieves the above-mentioned objectives, comprises a plurality of cantilever beam-like probes attached to an insulator support member having a top and bottom surface. Necessary impedance matching, compensating, and other circuits necessary to test a given integrated circuit chip are attached to the bottom surface of the insulator support member and make electrical contact with the attached ends of the beam-like probes. The probes are so positioned on the insulator support member that during the probing operation they are parallel to the beam leads of the integrated circuit under test.

One of the last steps in the fabrication of beam lead integrated circuits is to place the completed semiconductor wafer face down into a biwax compound and then to etch through the back side of the wafer in all areas corresponding to the positions of the beam leads. This mechanically separates the wafer into individual circuit chips and exposes the back sides of the beam leads, but leaves the chips in the same orientation with respect to each other that existed during the fabrication process. It is now possible to probe the back sides of these beam leads and obtain all necessary electrical test results. The top surfaces of the beam leads could be probed before the individual chips have been etched apart, however, it is more desirable to probe after the chips have been etched apart since there may be some damage to them during the etching process.

Monolithic integrated circuits containing bonding pads are normally tested while they are still in the completed semiconductor wafer form since they are generally separated by a mechanical cutting of the semiconductor wafer that does not always leave the individual chips in the exact same orientation they had prior to separation.

During the actual probing operation a force applied normal to the top surface of the insulator support card forces the fixture downward until the probes make contact with the beam leads of the integrated circuit under test. The resultant forces transmitted to the beam leads of the integrated circuit under test form an acute angle with the surfaces of the beam leads due to the acute angle the probes make with the beam lead surfaces.

These forces can be resolved into two components: one parallel to the surfaces of the beam leads; and the other normal to them. The force vectors parallel to the surfaces cause the probes to slide along the surfaces of the beam leads in a wiping action which tends to remove impurities from between the contacting surfaces and thereby result in very low contact impedance.

The mechanical characteristics of the probe material and its geometry cooperate to allow these force vectors parallel to the surfaces of the beam leads to slide the probes along the surfaces of the beam leads. This sliding contact action results in very low contact impedance and causes substantially no damage to the probed areas. The sliding action occurs along the longer axis of the beam leads due to the positioning of the probes with respect to each other and the beam leads of the integrated circuit under test.

This very low contact impedance feature, when combined with the very low probe impedance, allows more accurate dynamic measurements on subnanosecond responding integrated circuits still in semiconductor wafer form than was possible prior to this invention.

BRIEF DESCRIPTION OF THE DRAWING

These and other objects, features, and advantages of this invention will be better understood from the consideration of the following detailed description, taken in conjunction with the following drawing, in which:

FIG. 2 is an end view of one section view of FIG. 1;

FIG. 3 is a perspective view of the apparatus common to FIGS. 1, 2, and 4; and

FIG. 4 is a three-dimensional perspective view of another embodiment of the invention.

DETAILED DESCRIPTION

Figure 1:
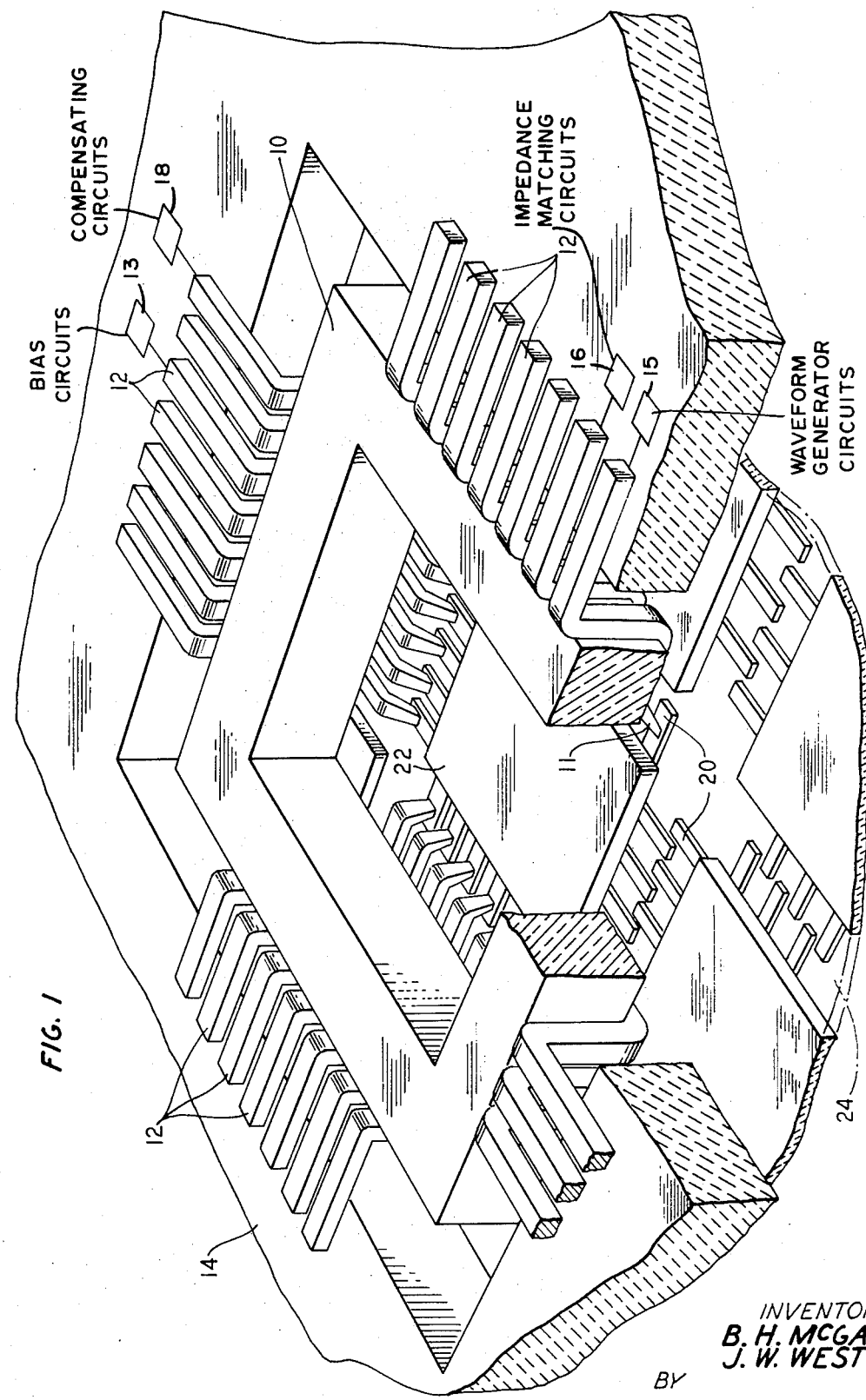
FIG. 1 is a partially sectioned perspective view of one embodiment of the invention.

FIG. 1 shows a test probe comprising an essentially rectangular picture frame insulator support member 10 on which cantilever beam-like probes 12 have been mechanically formed about and attached to the bottom and side surfaces thereof. All probes attached to any one of the four sides of the picture frame insulator support member 10 are parallel to one another. Each of one of the ends of the beam-like probes are coupled to the top surface of another insulator support member 14 that surrounds member 10. Impedance matching circuits 16 and compensating circuits 18, when needed, are electrically coupled to the ends of the beam-like probes that are coupled to the insulator support member 14. Bias and waveform generator circuits 13 and 15 may also be electrically coupled to appropriate probes.

The beam-like probes are shown contacting back sides of the beam leads 20 of an individual integrated circuit 22 which has been etched out of a completed semiconductor wafer 24. The unsupported sections of the probes whose ends contact the beam leads 20 of the integrated circuit 22 are numbered 11. The purpose of the test probe is to permit very accurate electrical tests on individual integrated circuit chips still part of a semiconductor wafer.

The cantilever beam-like probes are preferably fabricated from a 0.003 inch thick sheet of beryllium copper by a photolithic process. A variety of other metals of suitable thickness could be substituted for the beryllium copper. Typically the total length of an individual probe 12 is 0.125 inch and the unsupported section length 11 is 0.030 inch. The width of the probe is typically 0.003 inch but it, as well as the thickness and the unsupported length, may vary in proportion to the dimensions of the area to be probed. The spacing between the probes is determined by the spacing between the beam leads on the integrated circuit to be tested.

The number of individual probes is a function of the number of beam leads or bonding areas of the integrated circuit to be tested. Typically 4 to 64 probes are mounted on a single picture frame insulator support member. By using the same procedures hundreds of probes could be mounted on a single picture frame insulator support member.

Typically the picture frame insulator support member is fabricated from phenol fiber or a ceramic material 0.040 inch thick. The second insulator support member is typically fabricated from an epoxy fiber glass substrate or a ceramic substrate 0.025 inch thick.

The probes are fabricated simultaneously, attached to a picture frame insulator support member 10, and then formed into the desired geometry. The picture frame member is inserted into the opening of the second insulator support member 14 which has a top and bottom surface and an opening slightly larger than the picture frame insulator support member. One of the ends of each of the probes is then coupled to the top surface of the second insulator support member 14 so as to make electrical contact to the same point at which any necessary impedance matching, compensating, bias, and waveform generator circuits have been attached.

One major advantage of this embodiment is that the coupling of the probe ends to the second insulator support member does not have to be permanent, and, therefore, the picture frame insulator support and attached probes can be removed with relative ease and replaced if the probes should fail to operate properly.

Another advantage is the visibility of the probes while they are contacting the surfaces of the beam leads of the integrated circuit, which permits convenient monitoring of the testing operation.

FIG. 2 shows an end view of a single test probe 12 making contact at an angle $\theta$ with the surface of the beam lead 20 of an integrated circuit chip 22. The probe is supported by a picture frame insulator support member 10 which is located relatively close to the beam leads of the integrated circuits under test. This relationship allows the unsupported length of the probe to be relatively small.

The spring constant of a given metallic member is directly proportional, among other things, to its modulus of elasticity and the moment of inertia of the cross-sectional area of the member. The modulus of elasticity of the material used and the necessary unsupported probe length determine the minimum moment of inertia of the cross-sectional area that can be utilized in order for the probe to have sufficient rigidity to support its own weight without deforming. The location of the insulator support member 10 allows the unsupported length of the probes 11 to be relatively small. This means that a probe or relatively small cross-sectional area fabricated from material having a moderate modulus of elasticity will support its own weight.

Probe impedance is directly proportional to the physical dimensions of the probe. If the physical dimensions of the probes are small, the characteristic impedance can be low. In order to perform accurate high speed dynamic (AC) testing on integrated circuits it is necessary to use very low impedance probes to minimize undesirable transient effects and oscillations.

Applicants' probe geometry, spacial relationship between probes, and spring constant cooperate to achieve the sliding contact action which occurs during the probing action. In the actual probe testing operation, a force $F_1$ is applied normal to the top surface of the insulator support member 14 which forces the probes downward until they make contact with the beam leads 20 of the integrated circuit 22. A force $F_2$ is transmitted through the unsupported length of the probe 11 to the surface of the beam lead at an angle $\theta$. This force is shown resolved into two components: one, $F_3$, parallel to the surface of the beam lead; and the other, $F_4$, normal to it. Once contact has been made with the surfaces of the beam leads, force $F_3$ tends to force the probes to slide along these surfaces while force $F_4$, which is normal to the surface of the beam leads, tends to cause the probes to dig into them.

If the probe is constructed of a material having a relatively large spring constant, it will strongly resist any force which tends to deflect or bend it. In order to achieve sliding constant action, it is necessary for the probe to deflect in reaction to force $F_3$. There will be only minimal sliding contact action if the spring constant of the probe is relatively large. The only substantial action that would occur would be a response to force $F_4$, which would cause the probe to dig into the surface of the beam lead.

A probe with a relatively low spring constant would deflect too easily in reaction to the force vector normal to it and thereby decrease the magnitude of the force between the two surfaces and result in relatively high contact impedance between the probe and the surface of the beam lead.

This invention has, by providing a probe of the appropriate geometry and spring constant, achieved a desirable sliding contact action which causes minimal damage and results in low contact impedance.

In order to achieve a sliding contact action along the longer axis of the beam leads of an integrated circuit under test the probes attached to any one side of the picture frame insulator support member are constructed such that they are parallel to each other. This ensures that they will be parallel to the longer axis of the beam leads and, therefore, the sliding action that has been described above will occur along that axis. If the sliding action were to occur such that the probe moved across the width of the beam lead instead of along its length, it is possible that it would slide off the beam lead and, therefore, fail to make contact with it. This might cause a good circuit to be rejected.

FIG. 3 shows a partial perspective view of one of the beam-like probes 11 of FIGS. 1, 2, and 4 making contact with a beam lead 20 of an integrated circuit 22.

If, as during the normal probing operation, a force is applied normal to the top surface of the insulator support member, the probes will be forced downward toward the wafer of integrated circuits located directly below until they contact the beam leads of the integrated circuit selected for test. A force vector $F_2$ is transmitted through the probe to the surface of the beam lead being contacted at an angle $\theta$. This force vector is shown as the resultant of two component forces: one, $F_3$, parallel to the surface of the beam lead; and the other, $F_4$, perpendicular to the surface. Force vector $F_3$ tends to force the probe to slide along the longer axis of the surface of the beam leads of the integrated circuit under test.

The physical characteristics of the probe material and its geometry allow it to deflect in reaction to $F_3$ and, therefore, to slide along the surface of the beam lead. This sliding action cleans impurities lying between the contacting surfaces and, therefore, results in a relatively low contact impedance and causes substantially no damage to the probed areas.

As mentioned above, force $F_3$ tends to slide the probes along the surfaces of the beam leads. The geometry of the probes with respect to the beam leads is such that the probes slide along the beam lead surfaces parallel to the longer axis. The direction of the sliding contact action is shown by the broken lines on FIG. 3. This result is achieved because during the probing operation the probes are parallel to the longer axis of the beam leads and, therefore, the force created parallel to the surface of the beam leads causes the probes to slide along the longer axis of the beam leads.

FIG. 4 shows another embodiment of the invention in which cantilever beam-like probes 17 are coupled directly to the bottom surface of the insulator support member 14. Impedance matching circuits 16 and compensating circuits 18, when needed, are attached to the insulator support member and electrically coupled to the ends of the beam-like probes that are coupled to the insulator support member. Bias and waveform generator circuits 13 and 15 may also be electrically coupled to the appropriate probes. The probes are shown contacting the beam leads 20 of an integrated circuit 22. The unsupported length of each of the probes whose ends contact the beam leads 20 of the integrated circuit 22 is numbered 11.

A major advantage of this embodiment lies in the simplicity of its fabrication process. A sheet of beryllium copper can be affixed to the support member which contains an essentially rectangular or square opening; beam-like probes can be fabricated by a photolithic process and then formed into the proper orientation.

The cross-sectional dimensions of these probes can be almost identical to those probes described in FIG. 1. The total length of the individual probes can be less than for the probes of FIG. 1 since this embodiment does not utilize a picture frame insulator support member. This embodiment exhibits all of the advantages enumerated for the embodiment of FIG. 1 except the replacement feature.

It is intended that the embodiments described be merely for the purposes of illustration. Various other embodiments may be devised by those skilled in the art without departing from the spirit and scope of this invention.

We claim:

1. A fixed point test probe fixture useful for contacting the closely spaced terminals of integrated circuits which are still in the semiconductor wafer form comprising:

an insulator support member;

the structure of the insulator support member defining an opening therein;

a plurality of probes arranged in groups, each of the probes having first and second ends and a major and minor axis;

all of said probes in a group being substantially parallel to each other;

the first ends of the probes being attached to said insulator support member;

the second ends of the probes having relatively flat end surfaces that all lie in a common plane, the plane of each of the end surfaces forming an acute angle $\theta$ relative to the major axis of the second end of each probe; and the second ends of said probes extending horizontally into the opening in the insulator support member and then bending downward away from the insulator support member at the acute angle $\theta$ such that when the probe fixture is positioned above an integrated circuit, which is not yet separated from the semiconductor wafer form, and then guided downward, the relatively flat end surfaces of the second ends of the probes are forced to contact the terminals of the integrated circuit, thereby resulting in forces on the second ends of the probes that have components parallel to the terminals that cause sliding contacts to occur along the terminals.

2. The apparatus of claim 1 further comprising a picture frame insulated supporting member having a top, bottom and side surfaces and wherein the probes are attached to the picture frame member and extend horizontally into the opening in the picture frame member before bending downward at the acute angle $\theta$.

3. The fixed point test probe fixture of claim 2 further comprising impedance matching, compensation, bias and waveform generator circuits attached to said insulator support member and electrically coupled to said first ends of selected probes.

4. The fixed point test probe fixture of claim 3 wherein:

each of the probes is a relatively short metallic cantilever beam-like member having a substantially constant cross-sectional area which is substantially rectangular; and the width of each of the probes is not greater than the width of the terminals of the integrated circuit under test.

* * * * *